United States Patent
Viola et al.

(10) Patent No.: US 7,054,323 B2
(45) Date of Patent: May 30, 2006

(54) METHOD FOR PACKET DATA PROTOCOL CONTEXT ACTIVATION

(75) Inventors: Cindy J. Viola, Tempe, AZ (US); Jheroen P. Dorenbosch, Paradise, TX (US); Douglas A. White, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 1042 days.

(21) Appl. No.: 10/097,658

(22) Filed: Mar. 13, 2002

(65) Prior Publication Data

US 2003/0174679 A1     Sep. 18, 2003

(51) Int. Cl.
*H04L 12/28* (2006.01)

(52) U.S. Cl. ....................... 370/401; 370/338

(58) Field of Classification Search ............... 370/401, 370/338, 352, 353; 709/217, 238
See application file for complete search history.

(56) References Cited

U.S. PATENT DOCUMENTS

| 2003/0109272 A1* | 6/2003 | Mousseau et al. ........... 455/517 |
| 2003/0118010 A1* | 6/2003 | Ala-Luukko ................. 370/353 |
| 2004/0037269 A1* | 2/2004 | Lundin ........................ 370/352 |
| 2004/0205233 A1* | 10/2004 | Dunk ......................... 709/238 |

FOREIGN PATENT DOCUMENTS

| WO | WO 01/54437 A1  | 7/2001  |
| WO | WO 01/89252 A1  | 11/2001 |
| WO | WO 02/41592 A1  | 5/2002  |
| WO | WO 02/096133 A1 | 11/2002 |
| WO | WO 03/019973 A2 | 3/2003  |

* cited by examiner

*Primary Examiner*—Chau Nguyen
*Assistant Examiner*—Tito Pham
(74) *Attorney, Agent, or Firm*—Frank J. Bogacz

(57) ABSTRACT

A network requested PDP context activation (57) allows push applications (45) to unsolicited transmit push data to a mobile station (10). A gateway (30), GGSN (Gateway GPRS Support Node), typically initiates the network requested PDP context activation (57).

35 Claims, 3 Drawing Sheets

METHOD FOR PACKET DATA PROTOCOL CONTEXT ACTIVATION

BACKGROUND OF THE INVENTION

The present invention pertains to mobile internet protocol networks and more particularly to a method for push application services to a mobile station.

Push applications for push clients desire to deliver or "push" data to a mobile station using internet protocol. The data to be pushed to a mobile station includes weather announcements, alerts or advertisements.

In order to reach the mobile station, the push application must know or discover the mobile station's internet protocol address. In addition, for the data which is pushed to be appropriately delivered to the mobile station, the mobile station must have an active connection (i.e. a packet data protocol context) with a wireless gateway.

Push applications may need to push or transmit data to the mobile station at times when the mobile station does not have an active packet data protocol context or an internet protocol address within the wireless network. A push application can use an internet protocol address that has been allocated by a mobile internet protocol home agent (HA). The internet protocol address assignment will typically be done upon first registration of the mobile station.

When the mobile station deactivates its packet data protocol (PDP) context, the PDP context must be reactivated in order to receive the pushed data from a push application.

Accordingly, it would be highly desirable to have a method for packet data protocol context activation which may be requested by the network itself or a portion of the network.

DESCRIPTION OF THE PREFERRED EMBODIMENT

Figure 1:
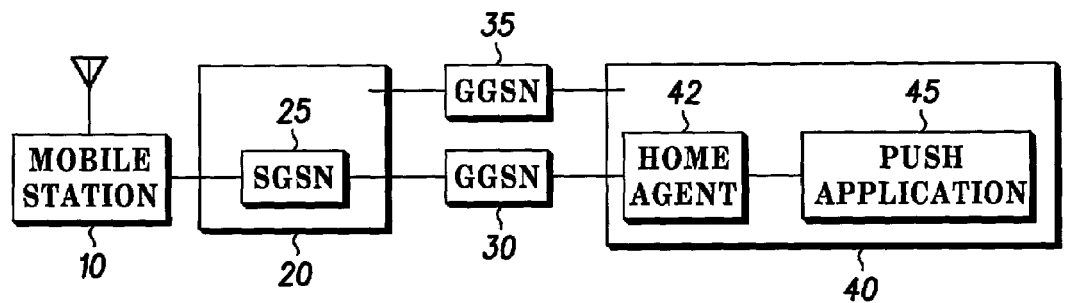
FIG. 1 is a block diagram of a network connection for push application to mobile station connection in accordance with the present invention.

FIG. 1 is a block diagram depicting the network interconnections for supporting push application services in accordance with the present invention. Generally, push application desires to "push" or send data to mobile station 10. Mobile station may include a single integrated device such as a mobile phone or attached devices such as a computer laptop using a mobile phone to communicate, paging devices and associated computers or other intelligent communication devices. Network 40 which is an internet protocol network includes the push application 45 and a mobile internet protocol home agent 42. Mobile station 10 is coupled through wireless service provider network 20 via a serving SGSN (Serving GPRS Support Node). SGSN 25 couples mobile station 10 through GGSN 30 (Gateway GPRS Support Node) to home agent 42, for example. Network 20 is coupled to external networks via one or more GGSNs 30 or 35. SGSN 25 and GGSN 30 are termed network devices. GGSN 30 is a wireless gateway which includes a mobile internet protocol foreign agent functionality. In a universal mobile telecommunications service network (UMTS), the interface between a foreign agent and a GGSN is not specified. Therefore, this interface may be considered as one integrated node. The functionality of the integrated node GGSN may be specified to be "enhanced with foreign agent functionality" (3GPP TS 23.121).

Push application 45 desires to push or send data such as weather alerts or advertisements, etc. to mobile station 10 using internet protocol. To communicate and couple to the mobile station 10, push application 45 must know or discover the mobile station's 10 internet protocol address. For pushed data to be received by mobile station 10, mobile station 10 must have an active connection (packet data protocol context) with a wireless gateway (GGSN). In this case the wireless gateway is GGSN 30. GGSN 35 may be used instead of GGSN 30 to accomplish the interconnection as well.

When mobile internet protocol is used, the push application 45 may use an internet protocol address that has been allocated by a mobile internet protocol home agent 42. The internet protocol address assignment is typically accomplished upon first registration by mobile station 10 with network 20.

Therefore, it is advantageous to this PDP context activation method for GGSN 30 to activate a PDP context with mobile station 10 when an internet protocol packet arrives from home agent 42.

Figure 2:
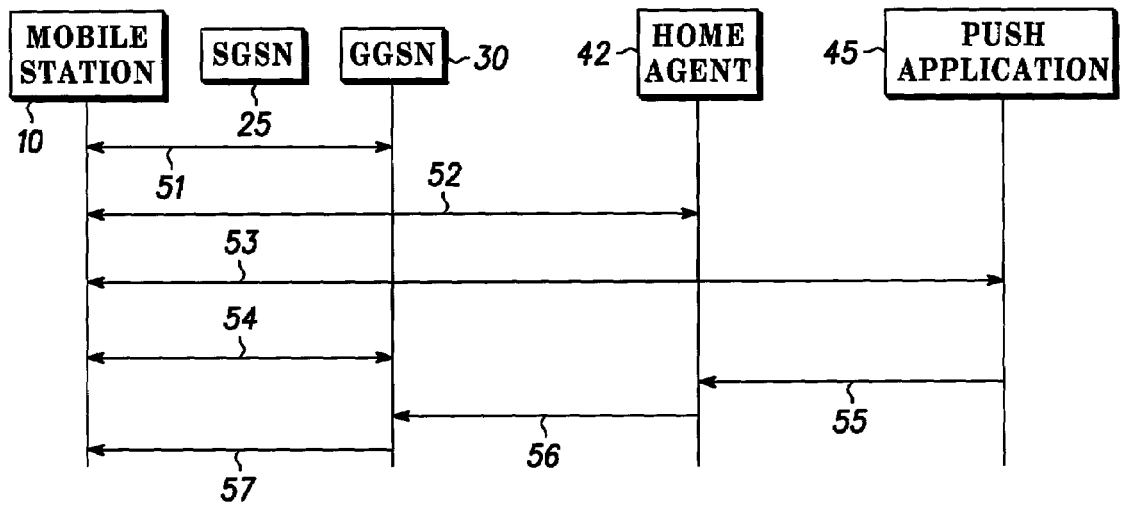
FIG. 2 is a message flow diagram of a network initiated packet data protocol context in accordance with the present invention.

Now turning to FIG. 2, a message flow diagram of the basic PDP context activation is shown. Initially, mobile station 10 activates a PDP context 51 through SGSN 25 with gateway GGSN 30. GGSN 30 then establishes a coupling with home agent 42 in internet protocol network 40. Mobile station 10 then registers 52 with home agent 42. Home agent 42 assigns a mobile internet protocol address to mobile station 10. This mobile internet protocol address is transmitted through GGSN 30 to mobile station 10. GGSN 30 captures the mobile internet protocol address for subsequent use.

Mobile station 10 registers 53 with push application 45. Mobile station 10 provides the mobile internet protocol address from the home agent 42 for use by push application 45. After mobile station 10 completes the registration process above and other activities using the PDP context, mobile station 10 deactivates 54 the PDP context with GGSN 30.

At some point in time thereafter, push application 45 decides to push data to mobile station 10. Push application 45 uses the mobile internet protocol address previously established by mobile station 10. This address directs communication 55 directs the push data to home agent 42. Home agent 42 uses standard mobile internet protocol mechanisms to deliver 56 the pushed data to GGSN 30 as a foreign agent. This delivery by home agent 42 may be accomplished using mobile internet protocol tunnel addressing. GGSN 30 uses the mobile internet protocol address previously saved in step 52 to direct that PDP context be activated 57 with mobile station 10. The pushed data may then be sent to mobile station 10.

In accomplishing the activation step 57, an access point name (APN) and mobile internet protocol address are specified by GGSN 30. These values may not be in agreement with the values stored in the home location register (not shown) in SGSN 25. When SGSN 25 validates the request for activation, step 57, the GGSN's transmitted values of APN and internet protocol address may not match the one stored in the SGSN 25. Accordingly, shown below are various options for the activation step 57.

Figure 3:
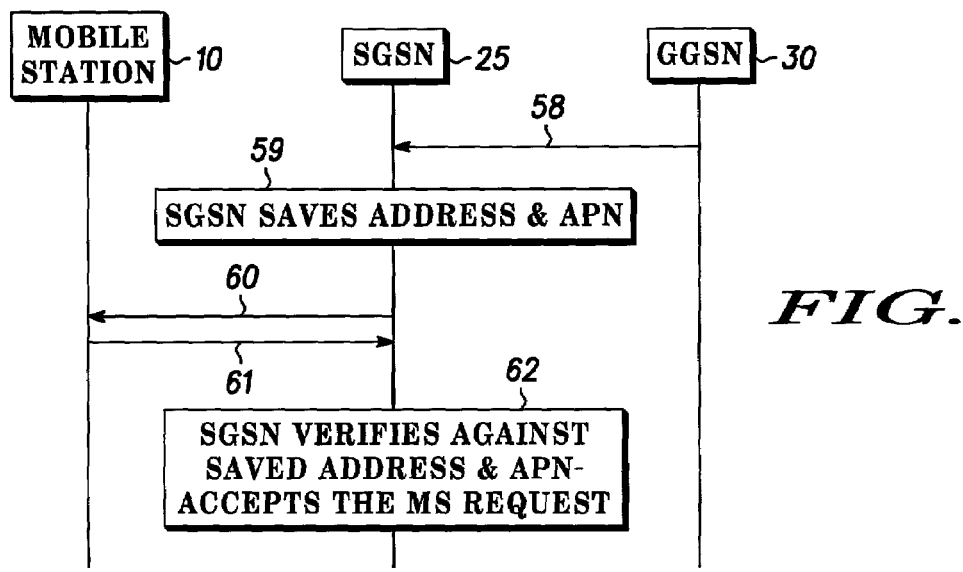
FIG. 3 is a message flow diagram of a network initiated packet data protocol context in accordance with the present invention.

First, the GGSN can include an address inside the PDU (Packet Data Unit) notification request message that the GGSN 30 sends to SGSN 25. Referring to FIG. 3, a message flow diagram of this embodiment of the invention is shown. This embodiment requires that communication standards are changed in the network such that a GGSN can instruct an SGSN to add a new internet protocol address including an APN to the addresses that are accepted during the validation process.

GGSN 30 sends a PDU notification request message 58 including a valid internet protocol address and associated access point name to SGSN 25. SGSN saves 59 the IP address and APN. SGSN 25 then sends a network requested activation 60 including the valid internet protocol address and APN to mobile station 10. Mobile unit 10 then responds by requesting a PDP context activation 61 with the valid IP address and associated APN to SGSN 25. SGSN then verifies the saved IP address and APN with the IP address and APN just received from mobile station 10. Since the IP address and APN were just relayed by SGSN 25 to mobile station 10 in step 60, the addresses match and SGSN accepts the request and transmits the pushed data through to mobile station 10.

Figure 4:
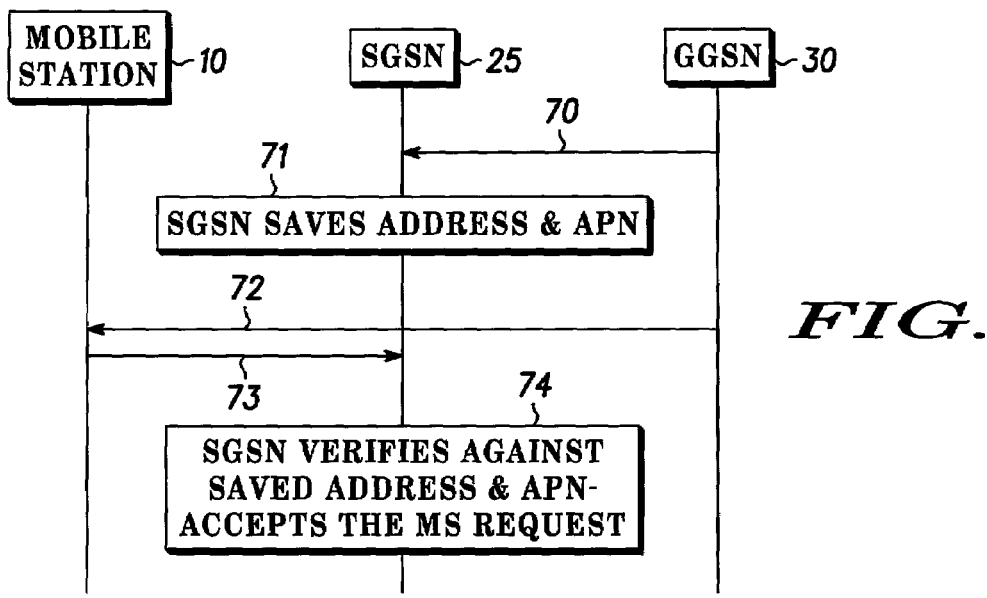
FIG. 4 is a message flow diagram of a network initiated packet data protocol context in accordance with the present invention.

Now turning to FIG. 4, another embodiment of the PDP context activation is shown. This embodiment includes sending a new command including IP address and APN prior to any PDU notification request 58.

As shown in FIG. 4, GGSN 30 transmits a new message 70 including a valid IP address and associated APN to SGSN 25. This new message or command indicates to SGSN 25 that it should accept the provided IP address and APN or the particular mobile station 10. SGSN 25 saves the IP address and associated APN 71. GGSN 30 then makes a network requested PDP context activation 72 to mobile station 10. Since the valid IP address and associated APN were passed to mobile station 10 in step 72, mobile station 10 responds with a PDP context activation 73 to SGSN 25. Since the IP address and associated APN sent by mobile station 10 in message 73 were the same as the one stored by the SGSN, the SGSN verifies that the IP address and APN match 74. Therefore, SGSN 25 allows the push data to be transmitted to mobile station 10.

Figure 5:
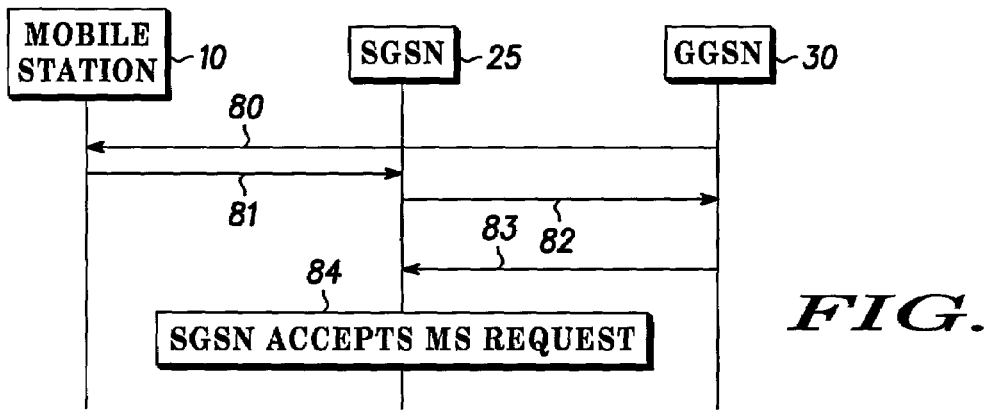
FIG. 5 is a message flow diagram of a network initiated packet data protocol context in accordance with the present invention.

In another embodiment as shown in FIG. 5, SGSN 25 may query GGSN 30 during the validation of mobile station 10's requested context activation. SGSN 25 may be required to query more than one GGSN. However, for the sake of brevity, a query of just one GGSN 30 is shown. Other queries would be similar.

GGSN transmits a network requested PDP context activation 80 to mobile station 10. Included in this activation request are an IP address and associated APN. Mobile station 10 responds with a typical PDP context activation request including the IP address and APN just received from GGSN 30. The PDP context activation request 81 is transmitted from mobile station 10 to SGSN 25. SGSN 25 then queries 82 GGSN 30. This query represents a new message sent to determine whether the IP address and APN are valid. GGSN 30 then responds with another new message 83 which indicates whether the IP address and APN transmitted to GGSN 30 in step 82 are valid. If the IP address and APN are valid. SGSN 25 then accepts mobile station 10's PDP context activation request and the push data may be transmitted to mobile station 10.

Figure 6:
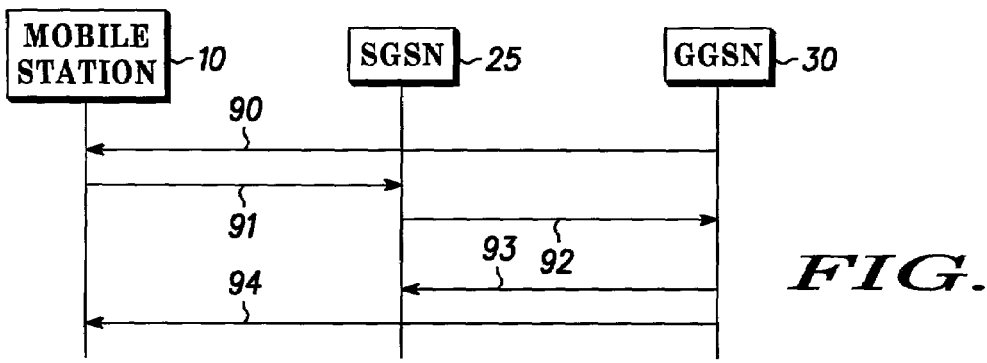
FIG. 6 is a message flow diagram of another embodiment of a message flow diagram of a network initiated packet data protocol context in accordance with the present invention.

FIG. 6 depicts another embodiment of the network requested PDP context activation. Prior to the message flow shown in FIG. 6, when mobile station 10 initially requests an activation of PDP context 51 as shown in FIG. 2, GGSN 30 captures and saves the APN used by mobile station 10 along with the IP address. Referring again to FIG. 6, GGSN 30 sends a network requested PDP context activation message 90 to mobile station 10. With message 90, GGSN 30 includes the appropriate APN and an IP address equal to zero. Mobile unit 10 responds to message 90 with a request to activate its PDP context using the IP address equal to zero and the APN provided by GGSN 30. In response to an IP address of zero, SGSN 25 permits the PDP context activation request to go forward. As a result, SGSN 25 transmits a create PDP context message 92 with an IP address equal to zero to GGSN 30. GGSN 30 responds with a create PDP context response message 93 again including an IP address equal to zero and the appropriate APN. Lastly, GGSN 30 sends a PDP context modification message 94 to mobile station 10. In this modification message 94, GGSN 30 includes the original IP address which was saved in step 51 of FIG. 2. Then the push data is allowed to be transmitted through GGSN 30, SGSN 25 to mobile station 10.

Figure 7:
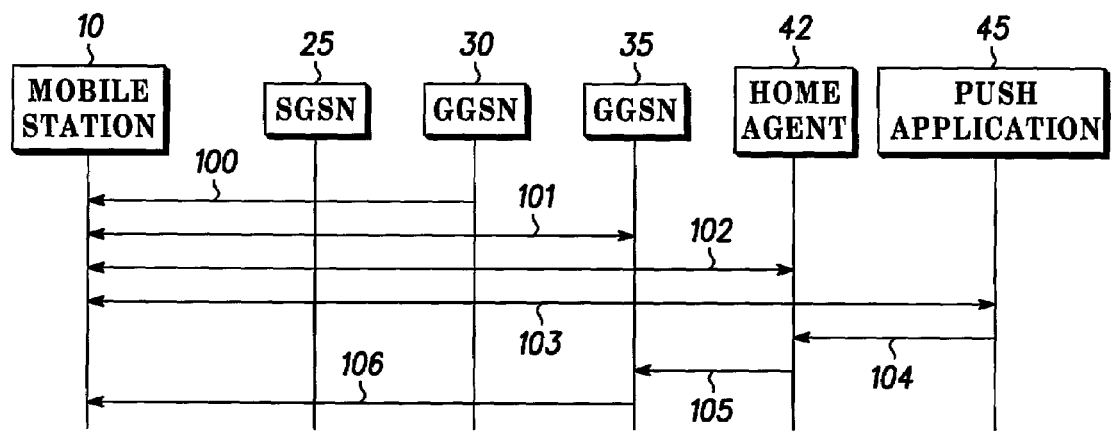
FIG. 7 is a message flow diagram of another embodiment of a message flow diagram of a network initiated packet data protocol context in accordance with the present invention.

Referring to FIG. 7, another embodiment of the network requested PDP context activation is shown. Initially, GGSN 30 transmits a network requested PDP context activation 100 through SGSN 25 to mobile station 10. Message 100 is similar to message 90 as shown in FIG. 6. Since more than one GGSN may be supporting the same access point name (APN) when mobile station 10 responds with a PDP context activation message 101, SGSN may forward this message to the wrong GGSN 35. Message 100 included an IP address equal to zero and the appropriate APN. When mobile station 10 responds with message 101, the IP address is equal to zero and the APN is the one received. When GGSN 35 receives message 101, GGSN has no knowledge of the original IP address, so no activation is achieved. As a result, mobile station 10 attempts to register with its home agent 42 by sending a registration message 102. As a result, mobile station 10 receives a second IP address which may be different from the IP address is was using. Mobile station 10 then requests to register with its push application 45 by sending registration message 103. Since mobile station 10 has a valid IP address it reregisters with push application 45 by sending registration message 103. When push application 45 receives the new registration message 103, it determines that there is un-received push data waiting for mobile station 10. Therefore, push application 45 transmits or resends the pushed data using the new IP address for mobile station 10. Push application 45 sends the pushed data via message 104 to home agent 42. Home agent 42 then utilizes the other GGSN 35 to send the push data via message 105. Lastly, GGSN 35 sends the push data via message 106 to mobile station 10.

Figure 8:
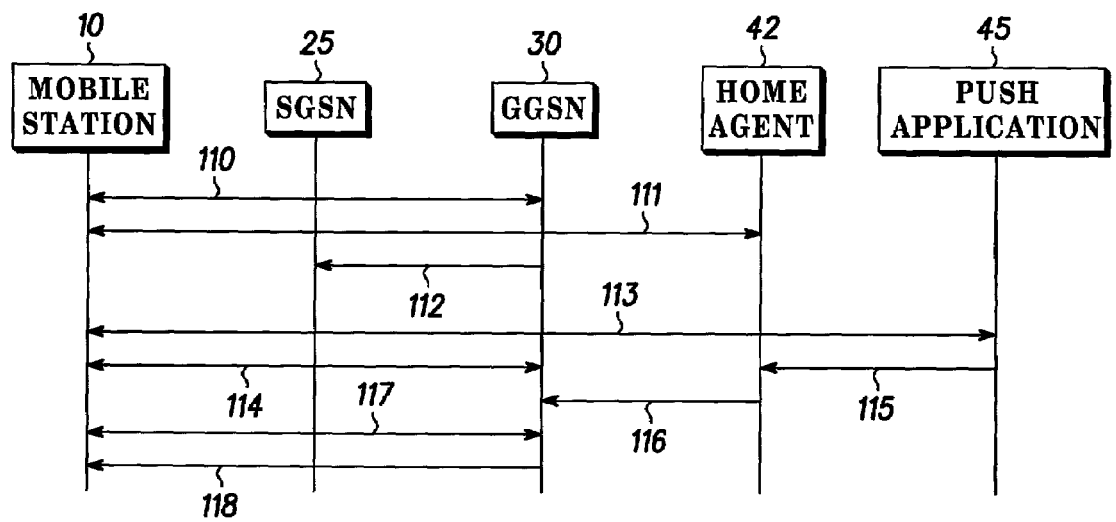
FIG. 8 is a message flow diagram of yet another embodiment of a message flow diagram of a network initiated packet data protocol context in accordance with the present invention.

Referring to FIG. 8, another embodiment of a network requested PDP context request is shown. Mobile unit 10 sends message 110 to activate its PDP context. The message is sent through SGSN 25 to GGSN 30. Mobile station 10 also registers 111 with its home agent 42 to obtain a valid IP address. When home agent 42 responds, GGSN 30 captures the IP address and associated APN. GGSN 30 treats the IP address and APN as a valid combination to be allowed for mobile station 10 during the duration of the mobile IP registration process. GGSN also sends message 112 to SGSN 25 to capture the mobile IP address and the duration of the address.

Mobile station 10 then registers its new IP address with push application 45 via registration message 113. Mobile station 10 may then choose to deactivate its PDP context via message 114 to GGSN 30.

At a future time, push application 45 decides to send push data to mobile station 10. Push application 45 sends the push data via message 115 to mobile station 10's home agent 42. Home agent 42 relays the pushed data to GGSN via message 116. GGSN 30 reactivates the PDP context with mobile station 10 via activate PDP context message sequence 117. The SGSN uses the address received in message 112 to validate the PDP context activation sequence 117. When the PDP context is reactivated, GGSN 30 then forwards the pushed data packets to mobile station 10 via message 118.

Accordingly by now it is appreciated that the present invention shows novel methods for network requested PDP context activation. Novel deactivation methodology is also disclosed. These methods may require the modification of communication network standards to allow a GGSN to indicate that an IP address should not be validated against an IP address in the SGSN's home location register. Further, the GGSN may perform network requested activation by specifying an IP address of zero. Lastly, the GGSN may perform network request context activation using a dynamic IP address.

This invention allows UMTS or GPRS network to providers to support push application data services through network request PDP activation.

Although the preferred embodiment of the invention has been illustrated, and that form described in detail, it will be readily apparent to those skilled in the art that various modifications may be made therein without departing from the spirit of the present invention or from the scope of the appended claims.

The invention claimed is:

1. A method for network initiated Packet Data Protocol (PDP) context activation comprising the steps of:
    registering by a mobile station with a push application using an IP address;
    activating a PDP context of the mobile station by a gateway; and
    saving by a network device the IP address and an access point name (APN).

2. The method for network initiated PDP context activation as claimed in claim 1, wherein the network device includes a serving node.

3. The method for network initiated PDP context activation as claimed in claim 2, wherein there is further included a step of sending a notification request by the gateway to the serving node, the notification request including a valid IP address and a valid access point name.

4. The method for network initiated PDP context activation as claimed in claim 3, wherein there is further included a step of requesting by the serving node a network initiated PDP context activation to the mobile station.

5. The method for network initiated PDP context activation as claimed in claim 4, wherein there is further included a step of responsive to the step of requesting, transmitting by the mobile station to the serving node a request for the PDP context activation, the request for network initiated PDP context activation including the valid IP address and the valid access point name.

6. The method for network initiated PDP context activation as claimed in claim 5, wherein there is further included a step of verifying the saved IP address and the access point name with the valid IP address and the valid access point name transmitted by the mobile station.

7. The method for network initiated PDP context activation as claimed in claim 6, wherein there is further included a step of requesting by the gateway a network initiated PDP context activation to the mobile station.

8. The method for network initiated PDP context activation as claimed in claim 7, wherein there is further included a step of responsive to the step of requesting, transmitting by the mobile station to the serving node a request for the network initiated PDP context activation, the request for PDP context activation including the valid IP address and the valid access point name.

9. The method for network initiated PDP context activation as claimed in claim 8, wherein there is further included a step of verifying the saved IP address and the access point name with the valid IP address and the access point name transmitted by the mobile station.

10. The method for network initiated PDP context activation as claimed in claim 1, wherein the network device includes the gateway.

11. The method for network initiated PDP context activation as claimed in claim 10, wherein there is further included a step of requesting by the gateway to the mobile station a network initiated PDP context activation.

12. The method for network initiated PDP context activation as claimed in claim 11, wherein there is further included a step of responsive to the step of requesting, transmitting by the mobile station to a serving node a request for the network initiated PDP context activation, the request for network initiated PDP context activation including a valid IP address and an access point name.

13. The method for network initiated PDP context activation as claimed in claim 12, wherein there is further included a step of sending by a serving node the valid IP address and the access point name to the gateway; and the serving node includes a SGSN.

14. The method for network initiated PDP context activation as claimed in claim 13, wherein there is further included the step of verifying by the gateway the valid IP address and the access point name.

15. The method for network initiated PDP context activation as claimed in claim 14, wherein there is further included a step of accepting by the serving node the mobile station's transmitted request.

16. A method for network initiated PDP context activation comprising the steps of:
    registering by a mobile station with a push application using an IP address;
    sending by a gateway a request for network initiated PDP context activation to a mobile station, the network initiated request including an IP address equal to zero and an access point name (APN); and
    sending, in response to the network initiated request, a PDP context activation request by the mobile station to a serving node, the PDP context activation request including the IP address equal to zero and the APN.

17. The method for network initiated PDP context activation as claimed in claim 16, wherein there is further included a step of transmitting by the serving node the PDP context activation request including the IP address equal to zero to the gateway.

18. The method for network initiated PDP context activation as claimed in claim 17, wherein there is further included a step of sending a response to the serving node, the response including the IP address equal to zero and the APN.

19. The method for network initiated PDP context activation as claimed in claim 17, wherein there is further included a step of sending by the gateway a modification message to the mobile station, the modification message including a valid IP address and the APN.

20. The method for network initiated PDP context activation as claimed in claim 16, wherein the step of sending by the mobile station the PDP context activation request includes the step of sending by the mobile station the PDP context activation request to a second gateway.

21. The method for network initiated PDP context activation as claimed in claim 16, wherein there is further included a step of registering by the mobile station with a home agent.

22. The method for network initiated PDP context activation as claimed in claim 21, wherein there is further included a step of transmitting push data by the push application to the home agent.

23. The method for network initiated PDP context activation as claimed in claim 20, wherein there is further included the step of relaying the push data by the home agent to the second gateway.

24. The method for network initiated PDP context activation as claimed in claim 23, wherein there is further included the step of sending the push data by the second gateway to the mobile station.

25. A method for network initiated PDP (Packet Data Protocol) context activation comprising the steps of:
   requesting a PDP context activation of a mobile station by a gateway;
   registering by the mobile unit with a home agent, the registering including sending a mobile internet protocol address to the home agent; and
   capturing by a serving node the mobile internet protocol address and duration time of the mobile internet protocol address.

26. The method for network initiated PDP context activation as claimed in claim 25, wherein there is further included a step of registering by the mobile station with a push application using the mobile internet protocol address.

27. The method for network initiated PDP context activation as claimed in claim 26, wherein there is further included a step of deactivating by the mobile station with the gateway the PDP context activation.

28. The method for network initiated PDP context activation as claimed in claim 26, wherein there is further included a step of sending push data by the push application to the home agent using the mobile internet protocol address.

29. The method for network initiated PDP context activation as claimed in claim 28, wherein there is further included a step of relaying the push data by the home agent to the gateway using a tunnel addressing.

30. The method for network initiated PDP context activation as claimed in claim 29, wherein there is further included a step of reactivating by the gateway the PDP context activation of the mobile station through the serving node.

31. A method for network initiated PDP (Packet Data Protocol) context activation comprising the step of:
   activating by a mobile station a PDP context with a gateway;
   assigning by a home agent a mobile internet protocol (MIP) address to the mobile station;
   registering by the mobile station with a push application using the MIP address; and
   deactivating by the mobile station the PDP context with the gateway.

32. The method for network initiated PDP context activation as claimed in claim 31, wherein there is further included a step of registering by the mobile station with the home agent.

33. The method for network initiated PDP context activation as claimed in claim 31, wherein there is further included a step of sending by the push application, push data to the home agent using the MIP address.

34. The method for network initiated PDP context activation as claimed in claim 33, wherein there is further included a step of relaying the push data by the home agent to the gateway using a tunnel addressing.

35. The method for network initiated PDP context activation as claimed in claim 34, wherein there is further included a step of reactivating the PDP context of the mobile station.

* * * * *